US008649676B2

(12) United States Patent
Ohtani

(10) Patent No.: US 8,649,676 B2
(45) Date of Patent: Feb. 11, 2014

(54) MOTOR CONTROL DEVICE AND IMAGING APPARATUS

(71) Applicant: Panasonic Corporation, Osaka (JP)

(72) Inventor: Yoshihiro Ohtani, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/756,578

(22) Filed: Feb. 1, 2013

(65) Prior Publication Data

US 2013/0201389 A1 Aug. 8, 2013

(30) Foreign Application Priority Data

Feb. 2, 2012 (JP) ................................. 2012-020577

(51) Int. Cl.
*G03B 5/00* (2006.01)
*G05B 19/29* (2006.01)
*G02B 15/02* (2006.01)

(52) U.S. Cl.
USPC .............................. 396/87; 318/603; 359/696

(58) Field of Classification Search
USPC ....................................... 396/85–87
See application file for complete search history.

(56) References Cited

U.S. PATENT DOCUMENTS

| 5,634,148 | A | * | 5/1997 | Kunishige et al. | 396/86 |
| 5,887,201 | A | * | 3/1999 | Maeno | 396/86 |
| 2003/0222617 | A1 | | 12/2003 | Nakai et al. | |
| 2005/0093490 | A1 | | 5/2005 | Shoji et al. | |
| 2009/0230911 | A1 | * | 9/2009 | Kikuchi | 318/603 |
| 2013/0201389 | A1 | * | 8/2013 | Ohtani | 348/360 |

FOREIGN PATENT DOCUMENTS

| JP | 63-314184 | 12/1988 |
| JP | 4-210789 | 7/1992 |
| JP | 2003-134866 | 5/2003 |
| JP | 2003-262904 | 9/2003 |
| JP | 2004-023890 | 1/2004 |
| JP | 2005-132029 | 5/2005 |

* cited by examiner

*Primary Examiner* — W B Perkey
(74) *Attorney, Agent, or Firm* — Panasonic Patent Center

(57) ABSTRACT

A motor control device includes a counter that counts pulses output from a one-phase encoder according to rotation of a DC motor, and a controller that recognizes rotation number of the DC motor based on the number of pulses counted by the counter. After the DC motor is braked, the controller starts applying a predetermined voltage to the DC motor at first timing before the DC motor stops, and stops applying the predetermined voltage at second timing after the DC motor stops. The controller subtracts the number of pulses generated after the second timing from a value counted by the counter. The predetermined voltage is lower than a lowest voltage necessary for driving a driven object, and is higher than a lowest voltage necessary for rotating the DC motor against an attracting force between a magnet and a coil in the DC motor.

7 Claims, 7 Drawing Sheets

MOTOR CONTROL DEVICE AND IMAGING APPARATUS

CROSS-REFERENCE TO RELATED APPLICATION

The present application claims foreign priority to JP 2012-020577, filed on Feb. 2, 2012, the contents of which are incorporated by reference.

BACKGROUND

1. Technical Field

The technical field relates to a motor control device for driving an object by a DC (direct current) motor and an imaging apparatus using the motor control device.

2. Related Art

A conventional motor control device controls a DC motor to drive an object connected to the DC motor and counts pulses generated by an encoder connected to the DC motor to detect a position of the object (for example, see JP 2003-262904 A).

For example, in a digital camera having the motor control device, a zoom lens is moved in a direction of an optical axis by the DC motor so that a view angle of a subject can be adjusted. Further, pulses output from the encoder connected to the DC motor are counted so that the position of the zoom lens is detected and information about zoom magnification is obtained.

SUMMARY

In the conventional motor control device in which a DC motor is used for driving an object and a one-phase rotary encoder is used for detecting a position of the object to be driven, accuracy of position detecting of the object is deteriorated.

It is a concern of the present disclosure to improve accuracy of detecting a position of an object to be driven in motor control using a DC motor and a one-phase encoder.

According to a first aspect, a motor control device is provided which controls rotation of a DC motor for driving an object. The motor control device includes a counter configured to count a pulse output from a one-phase encoder according to rotation of the DC motor, and a controller configured to recognize a rotation number of the DC motor based on the number of pulses counted by the counter. After the DC motor which is being driven is braked, the controller starts applying a predetermined voltage to the DC motor at a first timing which is a timing before the DC motor stops, and stops the applying of the predetermined voltage at a second timing which is a timing after the DC motor stops. The controller subtracts the number of pulses generated after the second timing from a value counted by the counter. The predetermined voltage is lower than a lowest voltage necessary for driving the object to be driven and higher than a lowest voltage necessary for rotating the DC motor against an attracting force between a magnet and a coil in the DC motor.

According to a second aspect, an imaging apparatus is provided. The imaging apparatus includes an imaging unit configured to capture a subject image incident through a lens to output image data, a DC motor for driving the lens, a one-phase encoder configured to generate a pulse according to rotation of the DC motor, a counter configured to count pulses output from the one-phase encoder, and a controller configured to recognize a rotation number of the DC motor based on the number of the pulses counted by the counter. After the DC motor which is being driven is braked, the controller starts applying a predetermined voltage to the DC motor at a first timing which is a timing before the DC motor stops, and stops the applying of the predetermined voltage at second timing which is a timing after the DC motor stops. The controller subtracts a number of the pulses generated after the second timing from a value counted by the counter. The predetermined voltage is lower than a lowest voltage necessary for driving the lens and higher than a lowest voltage necessary for rotating the DC motor against an attracting force between a magnet and a coil in the DC motor.

According to a third aspect, a lens barrel is provided. The lens barrel includes a lens, a DC motor for driving the lens, a counter configured to count pulses output from the one-phase encoder according to rotation of the DC motor, and a controller configured to recognize a rotation number of the DC motor based on the number of the pulses counted by the counter. After the DC motor which is being driven is braked, the controller starts applying a predetermined voltage to the DC motor at a first timing which is a timing before the DC motor stops, and stops the applying of the predetermined voltage at a second timing which is a timing after the DC motor stops. The controller subtracts the number of the pulses generated after the second timing from a value counted by the counter. The predetermined voltage is lower than a lowest voltage necessary for driving the lens and is higher than a lowest voltage necessary for driving the DC motor against an attracting force between a magnet and a coil in the DC motor.

According to the present disclosure, in the motor control using the DC motor and the one-phase encoder, the accuracy of detecting the position of the object to be driven can be improved.

DETAILED DESCRIPTION OF EMBODIMENTS

Figure 1:
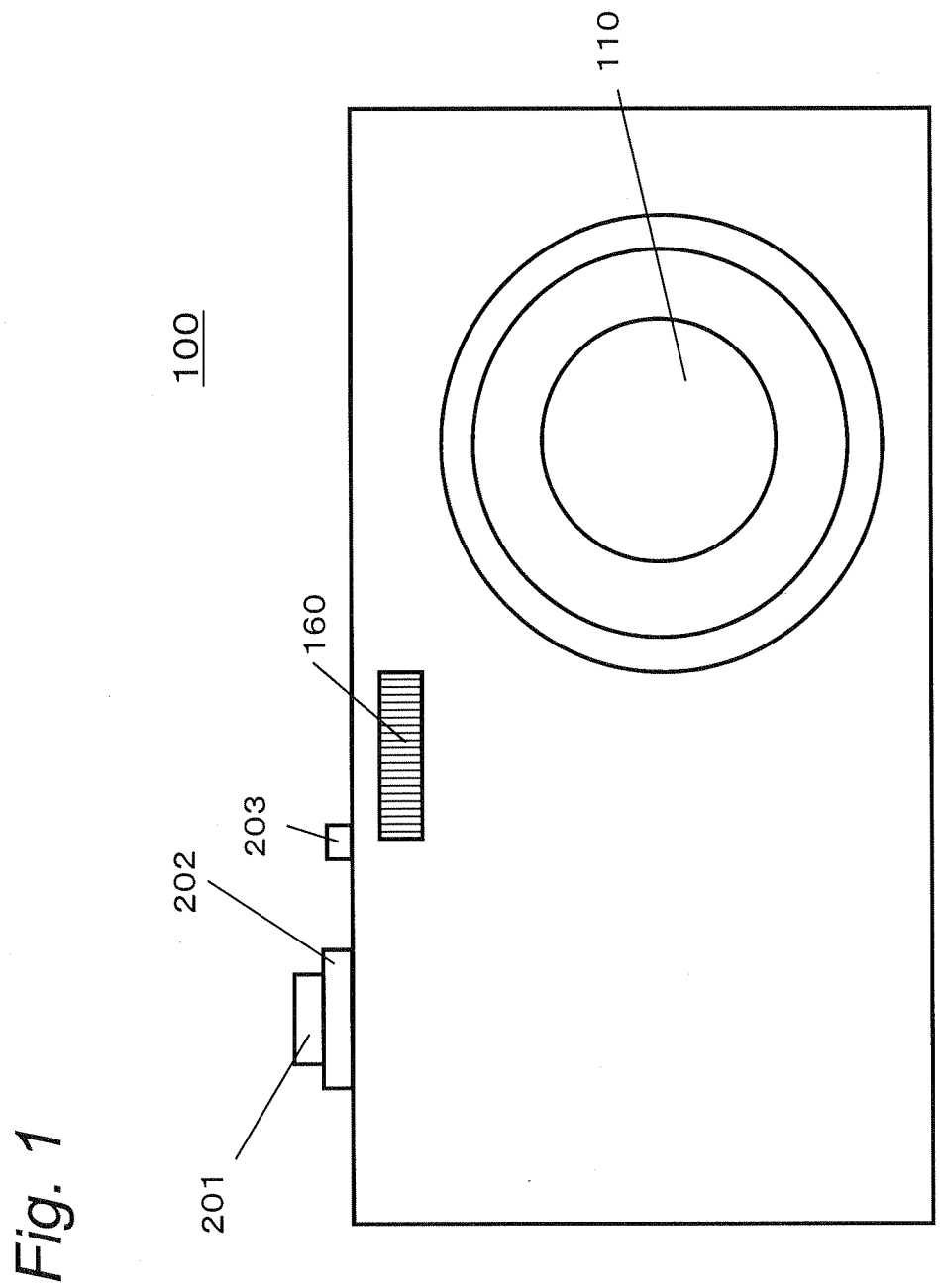
FIG. 1 is a front view illustrating a digital camera according to a first embodiment.

Embodiments will be described in detail below with reference to drawings. Description that is more detailed than necessary is occasionally omitted. For example, description about already-known items and overlapped description about the substantially same constitutions is occasionally omitted. This is for avoiding the following description from being more redundant than necessary and for making the understanding of people skilled in the art easy. The inventor(s) provide(s) the accompanying drawings and the following description in order to make the people skilled in the art sufficiently understand the present disclosure and are not intended to limit a subject matter recited in the claims.

First Embodiment

0. Problem in Control of DC Motor

In general, a DC motor includes a motor magnet and a motor coil. The motor magnet is provided to one of a stator and a rotor of the DC motor, and the motor coil is provided to the other of the stator and the rotor. In the DC motor, a rotating power of the motor is generated by an attraction force and a repulsive force caused by a magnetic force generated by energization of the motor coil and a magnetic force of the motor magnet.

When the energization of the motor coil in the DC motor is stopped in an operation for stopping the rotation of the DC motor, the motor coil is attracted to the motor magnet by the magnetic force of the motor magnet, and a rotating shaft of the motor would be stopped in a specific phase. That is to say, in some cases, even if the rotating shaft rotates in a normal direction during the energization of the motor coil, the motor coil is attracted to the motor magnet by the magnetic force of the motor magnet at the instant when the rotating shaft stops, and a rotating direction would be reversed just before stop so that the motor would stop in the specific phase.

On the other hand, a one-phase rotary encoder generates a pulse according to rotation of the DC motor. A motor control device counts pulses generated by the one-phase rotary encoder and calculates a rotation number of the DC motor. The one-phase rotary encoder has a simpler structure than that of a two-phase rotary encoder, enabling miniaturizing and reduction in cost. However, in principle, the one-phase rotary encoder cannot discriminate rotating direction of the DC motor.

As stated before, the DC motor might stop after rotating reversely (reverse rotation) with respect to a rotating direction originally intended (normal rotation). The one-phase rotary encoder cannot discriminate such a reverse rotation, and thus generates pulses similarly to the normal rotation. Therefore, for example, when pulses are counted for the reverse rotation with the reverse rotation being regarded as the normal rotation, an error is caused in the position detection. When such errors are accumulated due to long-time use, accuracy of detecting the position is deteriorated.

In view of solving the above problem, as well as other concerns, a configuration and an operation of an electronic device (a digital camera as one example) according to a first embodiment will be described.

1. Configuration

The configuration of a digital camera 100 will be described below with reference to the drawings. The digital camera according to the first embodiment (one example of the electronic device) has an optical system including a zoom lens (one example of an object to be driven) driven by a DC (direct current) motor, and can adjust a view angle between a wide-angle end and telephoto end through an operation of a zoom lever.

1-1. Configuration of Digital Camera

FIG. 1 is a front view of the digital camera 100. The digital camera 100 has a lens barrel for storing the optical system 110 and a flash 160 on its front surface. The digital camera 100 has operation buttons such as a still image release button 201, a zoom lever 202 and a power button 203 on its upper surface.

Figure 2:
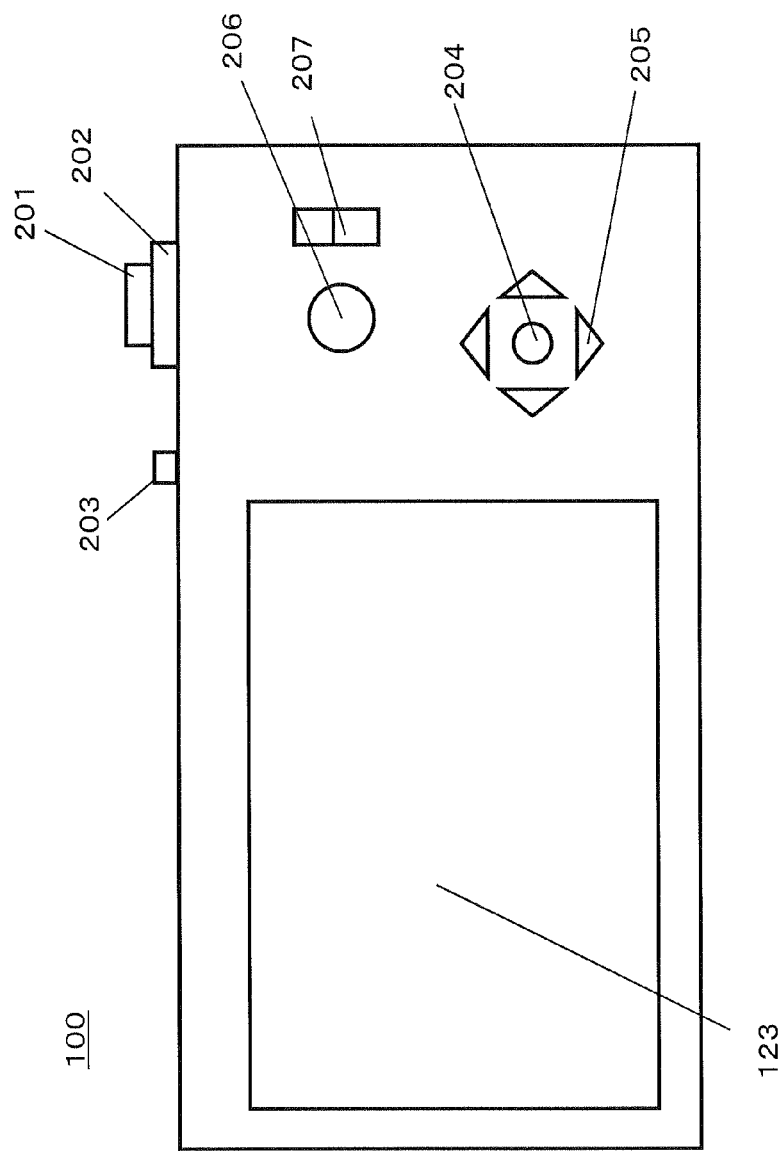
FIG. 2 is a rear view illustrating the digital camera according to the first embodiment.

FIG. 2 is a rear view of the digital camera 100. The digital camera 100 has operation buttons such as a liquid crystal display (LCD) monitor 123, a center button 204, cross buttons 205, a moving image release button 206 and mode changeover switches 207 on its rear surface.

Figure 3:
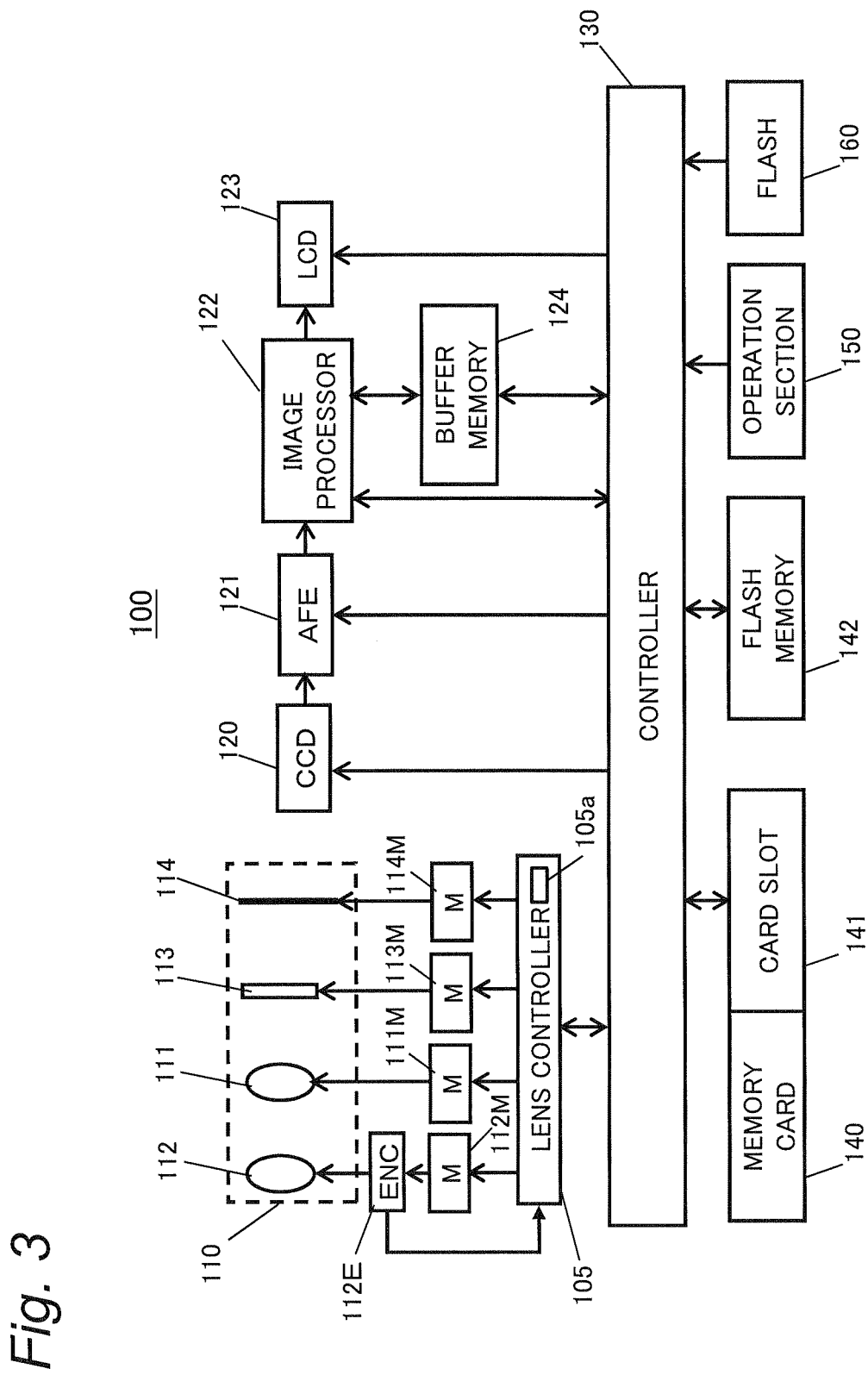
FIG. 3 is a diagram illustrating an electric configuration of the digital camera according to the first embodiment.

FIG. 3 is a diagram of an electrical configuration of the digital camera 100. The digital camera 100 captures a subject image formed via the optical system 110 with a CCD image sensor 120. The CCD image sensor 120 generates image data based on the captured subject image. The generated image data is subject to various processes in an AFE (Analog Front End) 121 and an image processor 122. Then the generated image data is recorded in a recording medium such as a flash memory 142 or a memory card 140 (in the first embodiment, the image data is typically recorded in the memory card 140). The image data recorded in the memory card 140 is displayed on the LCD monitor 123 by receiving a user's operation of an operation section 150. Details of the configuration shown in FIG. 1 through FIG. 3 will be described below.

The optical system 110 is composed of a focus lens 111, a zoom lens 112, a diaphragm 113 and a shutter 114. The optical system 110 may include an optical image stabilizer (OIS) lens (not shown). The optical system 110 may be composed of any number of lenses or any number of lens groups.

The focus lens 111 is used for adjusting a focus state of a subject. The zoom lens 112 is used for adjusting a view angle of a subject. The diaphragm 113 is used for adjusting an amount of light incident on the CCD image sensor 120. The shutter 114 adjusts exposing time of the light incident on the CCD image sensor 120. The focus lens 111 is driven by a motor 111M. The zoom lens 112 is driven by a motor 112M. The diaphragm 113 is driven by a motor 113M. The shutter 114 is driven by a motor 114M. The motors 111M to 114M are driven according to control signals sent from a lens controller 105 (one example of a motor controller).

The motor 112M is implemented by a DC motor. That is to say, the motor 112M has a motor magnet (not shown) and a motor coil (not shown), and a DC voltage is applied to the motor coil under control of the lens controller 105 to rotate the rotating shaft. While the motor 112M rotates, a one-phase rotary encoder (hereinafter, "an encoder") 112E generates pulses according to the rotation. The encoder 112E has a structure of a general rotary encoding including a light emitting device, a light receiving device and a code wheel provided with a plurality of slits arranged with equal intervals. The code wheel rotates in conjunction with the rotation of the motor 112M. The encoder 112E detects light that passes through the slits of the code wheel by means of the light receiving device, and outputs a pulse signal. The pulse generated by the encoder 112E is input into the lens controller 105, and a number of pulses is counted by the lens controller 105.

The lens controller 105 drives the motors 111M to 114M according to instructions from a controller 130 to control the optical system 110. The lens controller 105 has a counter 105a inside, and counts the number of pulses generated by the encoder 112E with the counter 105a to detect the position of the zoom lens 112. The lens controller 105 may be composed of a hard-wired circuit or a microcomputer using a program. The lens controller 105 may be integrated into one semiconductor chip together with the controller 130.

The CCD image sensor 120 (one example of an imaging unit) captures a subject image formed through the optical system 110 to generate image data. When the digital camera 100 is in a shooting mode, the CCD image sensor 120 can generate image data of a new frame at every constant time.

The AFE 121 carries out noise repression on the image data output from the CCD image sensor 120 by means of correlated double sampling, amplification on the image data to an input range of an A/D converter by means of an analog gain controller, and A/D conversion on the image data by means of an A/D converter. Thereafter, the AFE 121 outputs the image data to the image processor 122.

The image processor 122 executes various processes on the image data output from the AFE 121. The various processes include smear correction, white balance correction, gamma correction, a YC conversion process, an electronic zoom process, a compression process and a decompression process. However, the various processes are not limited to them. The image processor 122 stores image information that is subject to the various processes in a buffer memory 124. The image processor 122 may be implemented by a hard-wired electronic circuit or a microcomputer for executing programs. Further, the image processor 122 as well as the controller 130 may be integrated into one semiconductor chip.

The liquid crystal display (LCD) monitor 123 is provided to the rear surface of the digital camera 100. The liquid crystal display monitor 123 displays an image based on the image data processed by the image processor 122. Images to be displayed on the liquid crystal display monitor 123 include a through image and recording image. The through image is an image successively displayed based on image data of new frames generated at every constant time by the CCD image sensor 120. When the digital camera 100 is in the shooting mode, the image processor 122 normally generates a through image from the image data generated by the CCD image sensor 120. A user referring to the through image displayed on the liquid crystal display monitor 123, can shoot an image while checking a composition of the subject. The recording image is an image which is obtained by reducing the image data which has high pixel count and is recorded in the memory card 140 to a low pixel count image in order to display it on the liquid crystal display monitor 123, when the digital camera 100 is in a playback mode. The image data with high pixel count recorded in the memory card 140 is generated by the image processor 122 based on the image data generated by the CCD image sensor 120 after reception of user's operation of the release button.

The controller 130 may be implemented by a hard-wired electronic circuit or a microcomputer. Further, the controller 130 as well as the image processor 122 may be integrated into one semiconductor chip. A ROM does not have to be incorporated in the controller 130, and may be provided outside the controller 130.

The buffer memory 124 is a storage unit that functions as work memories of the image processor 122 and the controller 130. The buffer memory 124 can be implemented by a DRAM (Dynamic Random Access Memory), or the like. The flash memory 142 functions as an internal memory for storing the image data and setting information for the digital camera 100.

A card slot 141 is a connecting unit to which the memory card 140 is mountable. The card slot 141 can be electrically and mechanically connected to the memory card 140. The card slot 141 may be provided with a function for controlling the memory card 140.

The memory card 140 is an external memory containing a storage element such as a flash memory therein. The memory card 140 can store data such as image data to be processed by the image processor 122.

The operation section 150 is a general name of an operation button or an operation dial provided on a case of the digital camera 100, and receives user's operations. The operation section 150 corresponds to, for example, the still image release button 201, the moving image release button 206, the zoom lever 202, the power button 203, the center button 204, the cross buttons 205, and the mode changeover switches 207 shown in FIG. 1 and FIG. 2. When receiving user's operation, the operation section 150 sends the controller 130 various operation instructing signals.

The still image release button 201 is a pressing button taking two states having a half-press state and a full-press state. When the user half-presses the still image release button 201, the controller 130 performs AF (Auto Focus) control and/or AE (Auto Exposure) control to determine a shooting condition. Thereafter, when the user fully presses the still image release button 201, the controller 130 executes the shooting process. The controller 130 records image data captured at the full-press timing as a still image in the memory card 140. In the following description, simple description that the still image release button 201 is pressed means that it is fully pressed.

The moving image release button 206 is a pressing button for instructing start/end of moving image recording. When the user presses the moving image release button 206, the controller 130 sequentially records image data generated by the image processor 122 based on the image data generated by the CCD image sensor 120 as a moving image in the recording medium such as the memory card 140. When the moving image release button 206 is again pressed, the recording of the moving images is terminated.

The zoom lever 202 is a lever which normally returns to a center position and is used for adjusting the view angle between the wide-angle end and the telephoto end. When the user operates the zoom lever 202, the controller 130 detects the operation, and sends the lens controller 105 an instruction for driving the zoom lens 112. That is to say, when the zoom lever 202 is operated to a side of the wide-angle end, the controller 130 sends the lens controller 105 the instruction for driving the zoom lens 112 so that a subject is captured at a wider angle. Similarly, when the zoom lever 202 is operated to a side of the telephoto end, the controller 130 sends the lens controller 105 the instruction for driving the zoom lens 112 so that the subject is captured at a side closer to the telephoto end. When the operation of the zoom lever 202 is ended, the controller 130 sends the lens controller 105 an instruction for stopping the drive of the zoom lens 112.

The power button 203 is a pressing button for instructing power supply to the respective sections composing the digital camera 100 by the user. When the power button 203 is pressed by the user at a power-off state of the camera 100, the controller 130 supplies power to the respective sections composing the digital camera 100 to actuate them. When the power button 203 is pressed by the user at a power-on state of the camera 100, the controller 130 stops the power supply to the respective sections.

The center button 204 is a pressing button. When the digital camera 100 is in the shooting mode or the playback mode and the center button 204 is pressed by the user, the controller 130 displays a menu screen on the liquid crystal display monitor 123. The menu screen is a screen for setting various conditions of shooting/playback. The information set on the menu screen is recorded in the flash memory 142. When being pressed down with setting items of the various conditions being selected, the center button 204 functions also as a SET button.

The cross buttons 205 are pressing buttons provided to up, down, right and left directions. When the user presses any one of the cross buttons 205, the various condition items displayed on the liquid crystal display monitor 123 can be selected.

The mode changeover switch 207 is a pressing button provided to up and down directions. When the user slides the mode changeover switches up or down 207, the state of the digital camera 100 can be switched into the shooting mode or the playback mode.

The CCD image sensor 120 is one example of an imaging unit. The controller 130 is one example of an image recording unit.

2. Operation

2-1. Shooting Operation of Digital Camera

Figure 4:
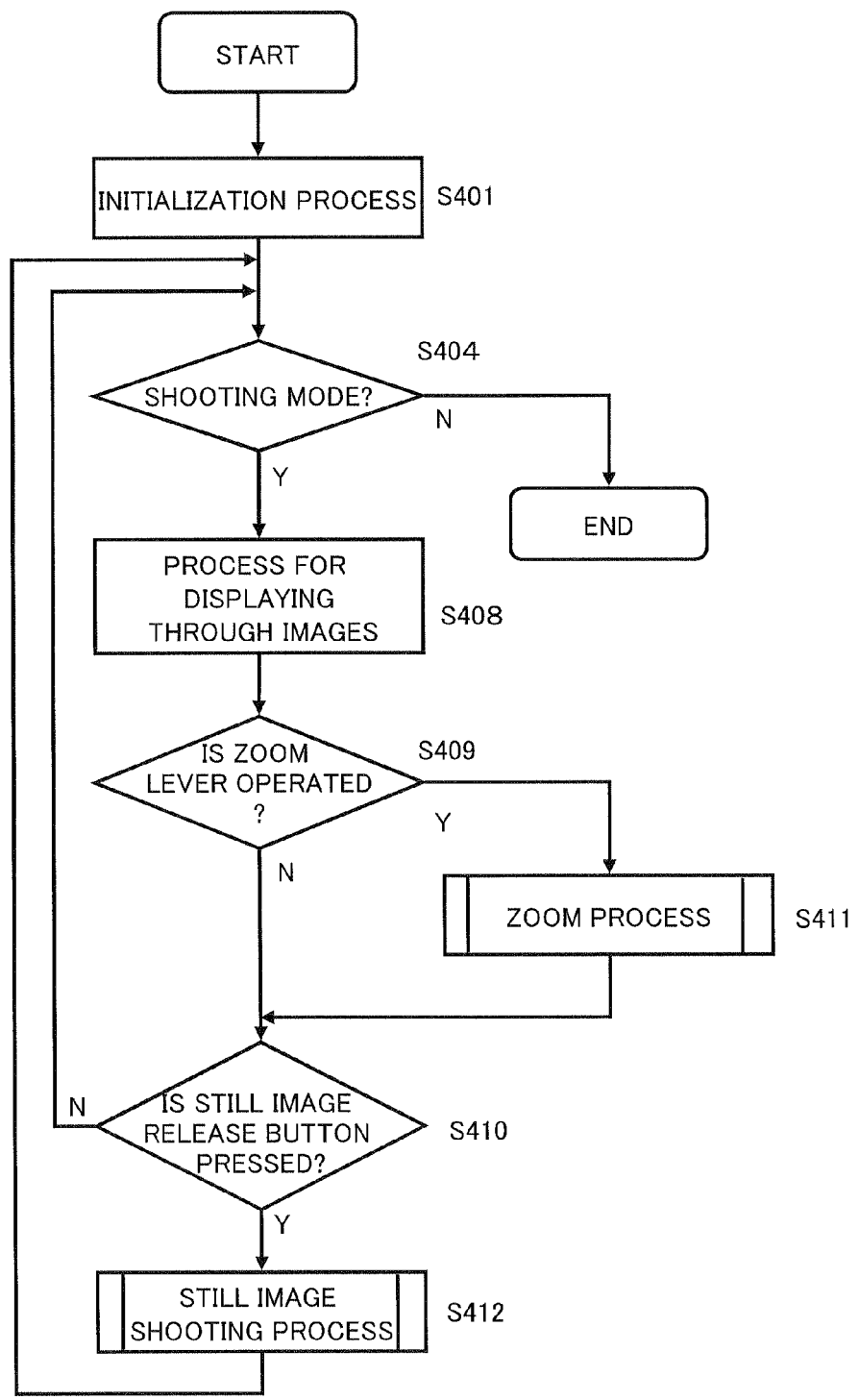
FIG. 4 is a flowchart illustrating a flow of a process in a shooting mode according to the first embodiment.

The shooting control of the digital camera 100 will be described. The digital camera 100 executes a recording process on the photographed image data. FIG. 4 is a flowchart of the shooting control in the shooting mode of the digital camera 100. The digital camera 100 can capture a moving image and a still image in the shooting mode, but especially the shooting of still images is described here.

When the digital camera 100 shifts to the shooting mode via a user's operation on the mode changeover switch 207, the controller 130 executes an initializing process necessary for recording still images (S401).

The controller 130 repeats a process for checking user's input and a display process, including a check for the state of the mode changeover switch 207 (S404), display of through images (S408), check of the operation of the zoom lever (S409) and check of pressing of the still image release button 201 (S410). In this case, when the state of the mode changeover switch 207 is not in the shooting mode at step S404, the process of the shooting mode is ended.

The controller 130 displays a through image according to setting values which are currently set (S408). At step S409, when the operation of the zoom lever is detected, the controller 130 transmits an instruction based on the operation of the zoom lever to the lens controller 105. The lens controller 105 executes a zoom process based on the instruction (S411). Details of the zoom process will be described later.

Thereafter, when the pressing of the still image release button 201 is detected (YES at S410), a still image shooting process is executed (S412). When the pressing of the still image release button 201 is not detected (NO at S410), the controller 130 repeats steps S404 to S411. When the still image shooting process (S412) is ended, the controller 130 returns to step S404 so as to repeat the above process.

Figure 5:
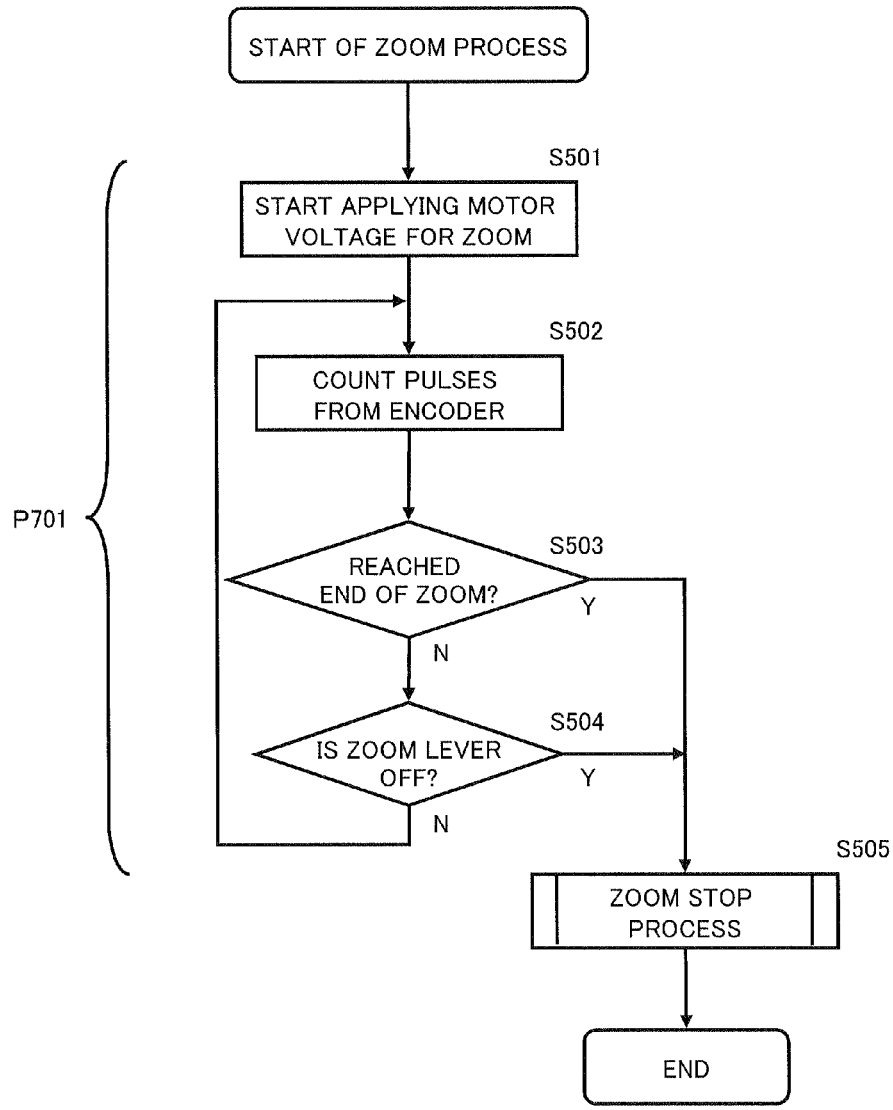
FIG. 5 is a flowchart illustrating a zoom process according to the first embodiment.

FIG. 5 is a flowchart illustrating the zoom process (S411). When detecting the user's operation of the zoom lever 202, the controller 130 instructs the lens controller 105 to drive the zoom lens 112 to the operated direction (wide angle/telephoto). The lens controller 105 starts to energize the motor 112M to rotate in the rotating direction corresponding to the operated direction (wide angle/telephoto) (S501). The lens controller 105 counts a number of pulses generated by the encoder 112E along with the rotation of the motor 112M to measure the position of the zoom lens 112 (S502). At this time, the lens controller 105 counts the number of pulses from the encoder 112E as a value of move amount in a positive moving direction of the lens (the positive rotating direction of the motor). However, since the encoder 112E is the one-phase encoder, a true rotating direction of the motor 112M cannot be determined based on the output from the encoder 112M. Therefore, the lens controller 105 determines the rotating direction of the motor based on polarity (positive/negative) of a voltage applied to the motor in the energization.

For example, a case is considered in which the zoom lens moves to the telephoto side when the positive voltage is applied to the motor and the number of pulses from the encoder 112E is counted with the direction where the zoom lens 112 moves towards the telephoto side being the positive direction (forward direction). In this case, when the controller 130 instructs the driving of the zoom lens 112 to the telephoto side, the lens controller 105 applies a positive voltage to the zoom lens 112 to move to the telephoto side. At this time, the lens controller 105 adds the number of pulses output from the encoder 112M to a value of a counter. When the controller 130 instructs the driving of the zoom lens 112 to the wide-angle side, the lens controller 105 applies a negative voltage to the zoom lens 112 to move the zoom lens 112 to the wide-angle side. The lens controller 105 subtracts the number of pulses output from the encoder 112M at this time from the value of the counter. As a result, the numerical value indicated by the counter represents a relative position of the zoom lens 112 between the telephoto end and the wide-angle end.

The lens controller 105 determines whether the zoom lens 112 reaches the wide-angle end/the telephoto end (S503) based on the count value counted at step S502. When the zoom lens 112 reaches the end, a zoom stop process is executed (S505). This determination can be made by, for example, storing preliminarily values of the counter provided when the zoom lens 112 is located at the wide-angle end and the telephoto end and determining whether the counter indicates the value. When the zoom lens 112 does not reach the end, the controller 130 further determines whether the zoom lever is operated into OFF (S504). When the zoom lever is operated into OFF, the controller 130 instructs the lens controller 105 to execute the zoom stop process (S505). On the other hand, when the zoom lever is not operated into OFF, the controller 130 and the lens controller 105 repeat the process from step S502. Details of the zoom stop process (S505) will be described below with reference to a flowchart in FIG. 6.

Figure 6:
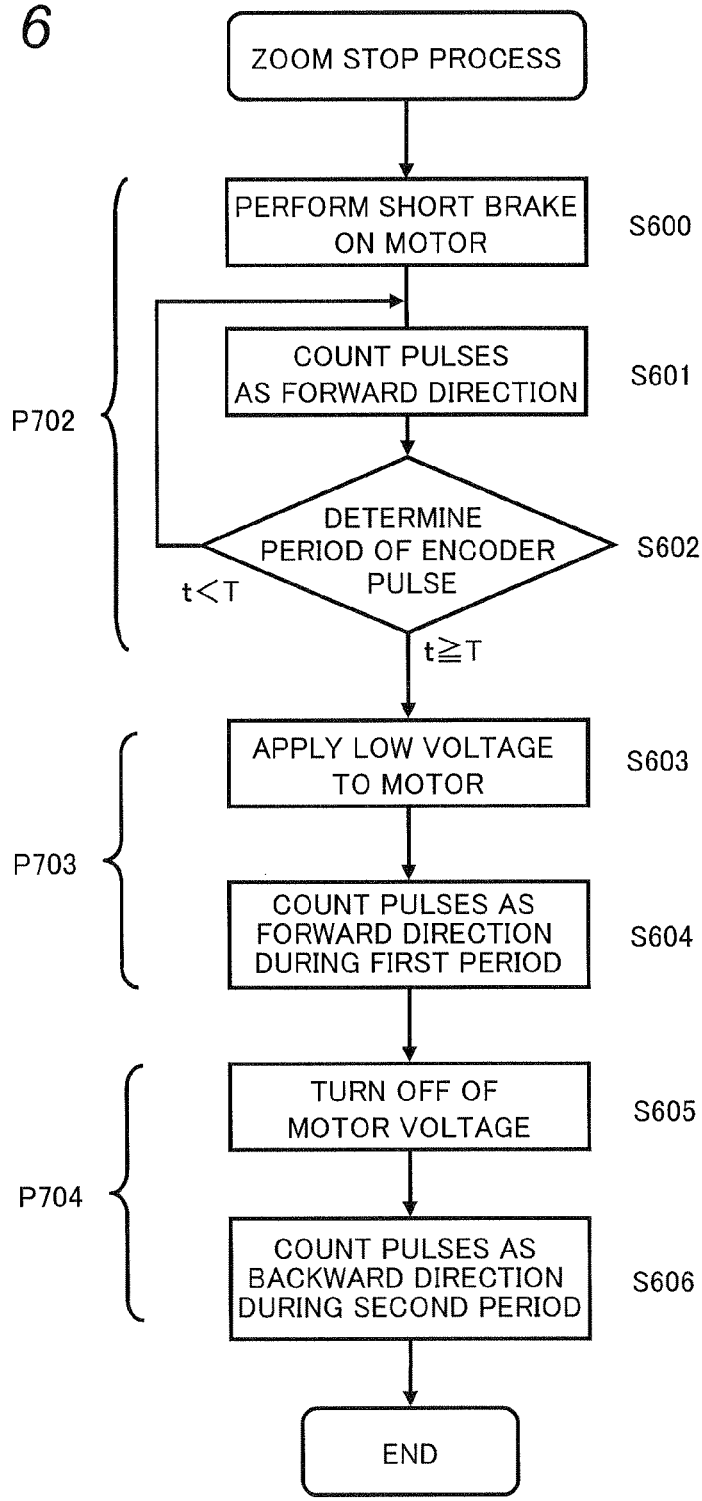
FIG. 6 is a flowchart illustrating a zoom stop process according to the first embodiment.

FIG. 6 is a flowchart illustrating the zoom stop process (S505). When receiving the instruction of the zoom stop process from the controller 130, the lens controller 105 first stops the energization for rotating the motor 112M, and starts a short brake to brake the motor 112M (S600). The short brake is made by short-circuiting both polar terminals of the motor coil in the DC motor to brake the DC motor. The short brake converts a freewheel rotation energy into an electric energy which is then consumed so that the freewheel rotation can be stopped more quickly. The lens controller 105 counts the number of pulses generated by the encoder 112E as the rotation in the forward direction after the start of the short brake (for example, when the zoom lever 202 is operated to the telephoto side, the number of pulses is added to the counter) (S601). In parallel with this, the lens controller 105 measures a period t of generated pulses and determines whether the period t is less than a threshold T (S602). When the lens controller 105 determines that the period t is less than the threshold T, step S601 is repeated. The threshold T is set to a period of the encoder 112E observed when, for example, the rotating speed of the motor 112M is not slow enough to make the motor coil be attracted to the motor magnet, but if the short brake is continued, is slow enough to stop when the encoder 112E generates several pulses thereafter.

When the period t is equal to or more than the threshold T (namely, the determination can be made that the motor is close to stop), the lens controller 105 stops the energization of the short brake at that time point (one example of first timing), and applies a low voltage (one example of a first voltage) of which polarity is the same as that of a voltage for driving in the forward direction, to the motor 112M (S603). The low voltage is a voltage that cannot make the motor 112M move the zoom lens 112 (an object to be driven) but generate a torque for preventing the motor coil of the motor 112M from being attracted to the motor magnet. The lens controller 105 counts the number of the pulses generated by the encoder 112E during a first predetermined period (W milliseconds) from start of the application of the low voltage to the motor 112M as a pulse in the forward direction (S604). After the first predetermined period (W milliseconds) passes from the start of the application of the low voltage (one example of second timing), the lens controller 105 stops the application of the low voltage to the motor 112M (S605). The first predetermined period (W milliseconds) is set to a sufficient time required for the motor 112M to completely stop since the start of the application of the low voltage to the motor 112M with the rotating period t of the motor 112M being not less than the threshold T. Therefore, after the first predetermined period (W milliseconds) passes from the start of the application of the low voltage to the motor 112M, the motor 112M completely stops. During the first predetermined period, the above low voltage is being applied to the motor 112M. For this reason, even if the motor 112M stops, the torque generated in the motor 112M by the low voltage prevents the motor coil from being attracted to the motor magnet. Since the torque generated in the motor 112M by the low voltage is weak, the driven object (the zoom lens 112) is not moved and stops in the forward direction.

When receiving pulses from the encoder 112E for a second predetermined period (W' milliseconds) after the application of the low voltage to the motor 112M is stopped, the lens controller 105 counts the number of the pulses as pulses in the opposite (backward) direction (S606). The lens controller 105 ends the zoom stop process after the second predetermined period (W' milliseconds) passes from the stop of the application of the low voltage.

Just before the end of the first predetermined period, the motor 112M completely stops in the forward direction due to the low voltage. When the low voltage application is stopped in this state, the pulses generated by the encoder 112E thereafter are considered to be generated by the rotation caused by attraction of the motor coil in the direction opposite to the forward direction by the motor magnet. It is noted that when the direction where the motor coil is attracted by the motor magnet is the forward direction, the motor 112E stops in the forward direction just before the end of the first predetermined period. For this reason, even if the low voltage application is stopped, the motor 112E does not move so that a pulse is not generated by the encoder 112E. The second predetermined period (W' milliseconds) is set to an enough length of time required for completely stopping the attraction of the motor coil in the motor 112M by the motor magnet (if moves) since the stop of the application of the low voltage. Therefore, after the second predetermined period (W' milliseconds) passes from the stop of the application of the low voltage to the motor 112M, the motor 112E would be in any one of the state that it is attracted to the direction opposite to the forward direction by the motor magnet (stops after the reverse rotation) and the state that it is attracted and fixed in the forward direction by the motor magnet (does not rotate at all).

Figure 7:
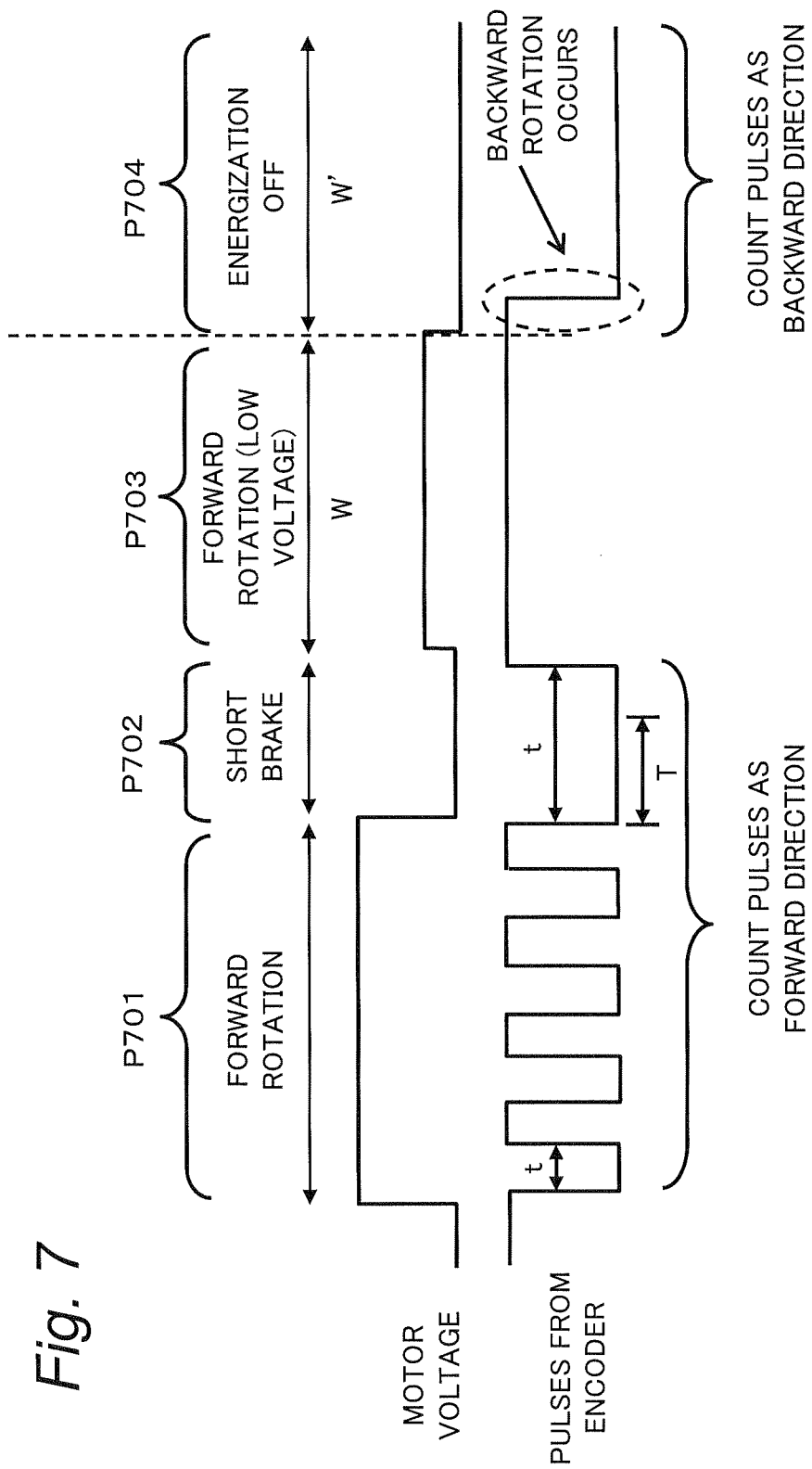
FIG. 7 is a diagram illustrating a state of pulses output from an encoder during the zoom stop process according to the first embodiment.

FIG. 7 is a diagram describing a relationship between the voltage (motor voltage) to be applied to the motor 112M by the lens controller 105 and the pulses generated by the encoder 112E during steps S501 to S504 in the flowchart of FIG. 5 and steps S600 to S606 in the flowchart of FIG. 6. In FIG. 7, regarding the pulse from the encoder, each of a rising edge and a falling edge is measured as one pulse. In the initial state, the value of the counter is 0. The steps S501 to S504 in the flowchart of FIG. 5 correspond to a period (P701) for which the applied voltage to the motor 112M causes the rotation in the forward direction. For the period P701, nine pulses are measured, and the value of the counter indicates 9.

The steps S600 to S602 in the flowchart of FIG. 6 correspond to a period (P702) of the short brake. During this period P702, one pulse is measured, and the value of the counter indicates 10. Since the period t in which this pulse is measured exceeds the threshold T, the short brake is stopped at that time, and the energization with the low voltage starts. The steps S603 to S604 in the flowchart of FIG. 6 correspond to a period (P703) of the rotation in the forward direction (low voltage). In the example shown in FIG. 7, during this period, no pulse is measured (if the pulse is generated, the counter is counted up). The steps S605 to S606 correspond to a period (P704) for which the applied voltage to the motor 112M is OFF. For this period, one pulse generated due to the reverse rotation of the motor 112M is measured, and only 1 is subtracted from the value of the counter so that the counter indicates 9. The conventional technique does not include the process for applying a low voltage unlike the period P703, and thus it is impossible to determine whether the pulse, that is generated by the encoder 112E in a period from the start of applying the short brake to the motor 112M until the stop of the energization with the low voltage, is generated by the rotation in the forward direction or in the opposite (backward) direction. On the contrary, in the first embodiment, it is clear that the pulses generated by the encoder 112E in the periods P701, P702 and P703 indicate the rotation in the forward direction and the pulse generated in the period P704 is the rotation in the direction opposite to the forward direction. For this reason, erroneously counting in the encoder 112E at the time when the motor 112M stops can be prevented.

3. Conclusion

The digital camera 100 according to the first embodiment is provided with the CCD 120, the motor 112M, the one-phase encoder 112E, the counter 105a, and the lens controller 105. The CCD 120 captures a subject image incident through the optical system 110 including the zoom lens 112 to output image data. The motor 112M drives the zoom lens 112. The one-phase encoder 112E generates pulses according to the rotation of the motor 112M. The counter 105a counts the pulses output from the one-phase encoder 112E. The lens controller 105 recognizes the rotation number of the DC motor based on the number of pulses counted by the counter 105a. After the driving motor 112M is braked, the lens controller 105 starts applying the low voltage (predetermined voltage) to the motor 112M at a first timing which is a timing before the motor 112M stops, and stops applying the low voltage at a second timing which is a timing after the motor 112M stops. The lens controller 105 subtracts the number of pulses generated after the second timing from the value counted by the counter 105a. The low voltage (the predetermined voltage) is set to a voltage that is lower than a lowest voltage necessary for driving the lens and is higher than a lowest voltage necessary for rotating the DC motor against the attracting force between the magnet and the coil in the DC motor.

With such a configuration, it is ensured that the pulses generated after the second timing are pulses representing the reverse rotation, and thus the rotating direction of the motor 112M can be accurately recognized. Therefore, erroneously counting of pulses generated by the one-phase encoder can be prevented, and thus the accuracy of detecting the position of the zoom lens 112 can be improved.

4. Other Embodiments

The first embodiment is described above as the example of the technique disclosed in the present disclosure. However, the technique in the present disclosure is not limited to this, and thus it can be applied also to embodiments where changes, replacements, additions and omission are suitably carried out. Further, the components described in the first embodiment are appropriately combined so that new embodiments can be provided. Other embodiments will be, therefore, illustrated below.

In the above embodiment, the short brake is operated in the zoom stop process. However, the short brake is not operated, and only the applying of a voltage to the motor may be stopped. Even in this case, the rotation of the motor is gradually slower due to a friction force and stops eventually. In another manner, the applied voltage to the motor may be gradually reduced to stop the motor. In another manner, a voltage of which polarity is opposite to the voltage for the forward rotation is applied to the motor so that the motors may be stopped. That is to say, the parameters (T, W, and W') are suitably determined according to the stopping process, so that the low voltage may be applied before and after the rotation of the motor stops.

In the above embodiment, in the zoom stop process, the low voltage is started to be applied to the motor 112M based on the period t of the pulse generated by the encoder 112E (S602) after the brake starts (S603). However, the determination of the applying timing of low voltage to the motor 112M is not limited to this. Instead of the monitoring of the period of the pulse generated by the encoder 112E, the low voltage may be started to be applied after the predetermined time passes from the start of the brake. At this time, the predetermined time is set to a period longer than a period since the start of the brake and until the speed of the motor 112M is reduced to a sufficient low speed. The sufficiently low speed is, set to a speed which, for example, is not low enough for the motor coil to be attracted to the motor magnet, but is low enough for the motor 112M to stop after the encoder 112E generates several pulses if the short brake continues to operate thereafter.

In the above embodiment, T, W and W' are predetermined values, but may be changed (adjusted) according to a state such as environmental temperature.

In the above embodiment, the configuration of the digital camera containing the optical system is described, but the idea of the embodiment can be applied also to lens-interchangeable-type cameras. In this case, interchangeable lenses (namely, a lens barrel) include the optical system described in the above embodiment, the motor for driving the optical system, the encoder for counting the rotation number of the motor, and the lens controller for controlling the respective sections in the interchangeable lenses. The lens controller may conduct the control described in the above embodiment.

The above embodiment described the example using the zoom lens as the object to be driven of the DC motor, but even when the object to be driven is another member, the idea of the motor control in the present disclosure can be applied.

The above embodiment illustrated the digital camera as the electronic device having a motor control device, but the idea of the motor control in the present disclosure can be applied to devices (electronic devices, industrial machine) for driving the object to be driven with the DC motor. For example, the idea of the motor control in the present disclosure can be applied also to driving control of a DC motor to be used for robots. That is to say, the idea of the motor control in the present disclosure can be applied to entire motor control using a DC motor and a one-phase encoder.

The embodiment is described as the example of the technique in the present disclosure. For this reason, the accompanying drawings and the detailed description are provided.

Therefore, the components described in the accompanying drawings and the detailed description include not only the components essential for solving the problem but also components that are not essential for solving the problem in order to illustrate the above technique. For this reason, even when the unessential components are described in the accompanying drawings and the detailed description, these unessential components should not be immediately regarded as essential components.

Since the above embodiment illustrates the technique in the present disclosure, various changes, replacements, additions and omissions can be carried out within the scope of claims and its equivalent scope.

INDUSTRIAL APPLICABILITY

According to the present disclosure, in the motor control device using the DC motor and the one-phase encoder, the accuracy of detecting the position of the driven section can be improved. The idea of the present disclosure can be, therefore, applied also to digital still cameras, movie cameras, mobile telephones, smart phones, mobile PCs, and robots.

What is claimed is:

1. A motor control device for controlling rotation of a DC motor for driving an object, comprising:
   a counter configured to count a pulse output from a one-phase encoder according to rotation of the DC motor; and
   a controller configured to recognize a rotation number of the DC motor based on the number of pulses counted by the counter, wherein
   after the DC motor which is being driven is braked, the controller starts applying a predetermined voltage to the DC motor at a first timing which is a timing before the DC motor stops, and stops the applying of the predetermined voltage at a second timing which is a timing after the DC motor stops,
   the controller subtracts the number of pulses generated after the second timing from a value counted by the counter, and
   the predetermined voltage is lower than a lowest voltage necessary for driving the object to be driven and higher than a lowest voltage necessary for rotating the DC motor against an attracting force between a magnet and a coil in the DC motor.

2. The motor control device according to claim 1, wherein the controller starts the applying of the predetermined voltage to the DC motor, when a rotating period of the DC motor is not less than a predetermined value.

3. The motor control device according to claim 1, wherein the controller starts the applying of the predetermined voltage to the DC motor when a predetermined time passes after the brake of the DC motor is started.

4. The motor control device according to claim 1, further comprising:
   the DC motor configured to rotate the object; and
   the one-phase encoder configured to generate a pulse according to the rotation of the DC motor.

5. An electronic device, comprising the motor control device according to claim 1.

6. An imaging apparatus, comprising:
   an imaging unit configured to capture a subject image incident through a lens to output image data;
   a DC motor for driving the lens;
   a one-phase encoder configured to generate a pulse according to rotation of the DC motor;

a counter configured to count pulses output from the one-phase encoder; and a controller configured to recognize a rotation number of the DC motor based on the number of the pulses counted by the counter, wherein after the DC motor which is being driven is braked, the controller starts applying a predetermined voltage to the DC motor at a first timing which is a timing before the DC motor stops, and stops the applying of the predetermined voltage at second timing which is a timing after the DC motor stops, the controller subtracts a number of the pulses generated after the second timing from a value counted by the counter, and the predetermined voltage is lower than a lowest voltage necessary for driving the lens and higher than a lowest voltage necessary for rotating the DC motor against an attracting force between a magnet and a coil in the DC motor.

7. A lens barrel, comprising:
a lens;
a DC motor for driving the lens;
a counter configured to count pulses output from a one-phase encoder according to rotation of the DC motor; and a controller configured to recognize a rotation number of the DC motor based on the number of the pulses counted by the counter, wherein after the DC motor which is being driven is braked, the controller starts applying a predetermined voltage to the DC motor at a first timing which is a timing before the DC motor stops, and stops the applying of the predetermined voltage at a second timing which is a timing after the DC motor stops, the controller subtracts the number of the pulses generated after the second timing from a value counted by the counter, and the predetermined voltage is lower than a lowest voltage necessary for driving the lens and is higher than a lowest voltage necessary for driving the DC motor against an attracting force between a magnet and a coil in the DC motor.

* * * * *